US012782228B2

(12) United States Patent
Ebata

(10) Patent No.: US 12,782,228 B2
(45) Date of Patent: Nov. 3, 2026

(54) TRAVELING-WAVE EXCITATION DEVICE AND TRAVELING-WAVE EXCITATION METHOD

(71) Applicant: IHI Corporation, Tokyo (JP)

(72) Inventor: Shigekazu Ebata, Tokyo (JP)

(73) Assignee: IHI Corporation, Tokyo (JP)

( * ) Notice: Subject to any disclaimer, the term of this patent is extended or adjusted under 35 U.S.C. 154(b) by 243 days.

(21) Appl. No.: 18/806,780

(22) Filed: Aug. 16, 2024

(65) Prior Publication Data

US 2024/0401484 A1 Dec. 5, 2024

Related U.S. Application Data

(63) Continuation of application No. PCT/JP2022/045066, filed on Dec. 7, 2022.

(30) Foreign Application Priority Data

Mar. 31, 2022 (JP) ................................ 2022-058812

(51) Int. Cl.
*G01M 7/02* (2006.01)
*F01D 5/26* (2006.01)

(52) U.S. Cl.
CPC ................ *G01M 7/02* (2013.01); *F01D 5/26* (2013.01)

(58) Field of Classification Search
None
See application file for complete search history.

(56) References Cited

U.S. PATENT DOCUMENTS

| | | | | |
|---|---|---|---|---|
| 4,389,891 | A | 6/1983 | Fournier | |
| 2002/0050719 | A1* | 5/2002 | Caddell | F02K 7/12 290/54 |

(Continued)

FOREIGN PATENT DOCUMENTS

| | | | |
|---|---|---|---|
| CN | 111504585 | A | 8/2020 |
| JP | 6-102106 | A | 4/1994 |

(Continued)

OTHER PUBLICATIONS

International Search Report issued Jan. 31, 2023 in PCT/JP2022/045066 filed on Dec. 7, 2022, 2 pages.

(Continued)

*Primary Examiner* — Suman K Nath
(74) *Attorney, Agent, or Firm* — Oblon, McClelland, Maier & Neustadt, L.L.P.

(57) ABSTRACT

A traveling-wave excitation method includes, when exciting blades of a rotor blade by using excitation sources having a one-to-one correspondence with the blades with phases corresponding to excitation signals inputted respectively to the excitation sources, upon a number of nodal diameters of a vibration to be generated in the rotor blade by excitation of the blades being an even number, causing a same excitation signal to be inputted respectively to a pair of excitation sources of the excitation sources with a same phase, the pair of excitation sources corresponding to a pair of blades of the blades located at positions different from each other by 180° in a rotation direction of the rotor blade, and upon the number of the nodal diameters being an odd number, causing the same excitation signal to be inputted respectively to the pair of excitation sources with opposite phases.

4 Claims, 8 Drawing Sheets

(56) References Cited

U.S. PATENT DOCUMENTS

| | | | | |
|---|---|---|---|---|
| 2009/0262421 | A1* | 10/2009 | Buican | G02F 1/0131 359/485.01 |
| 2013/0038123 | A1* | 2/2013 | Wilkins | H02J 13/1337 307/18 |

FOREIGN PATENT DOCUMENTS

| | | | |
|---|---|---|---|
| JP | 2000-146772 | A | 5/2000 |
| JP | 2002-98584 | A | 4/2002 |
| JP | 2012-149979 | A | 8/2012 |
| JP | 2018-204504 | A | 12/2018 |
| JP | 2019-52975 | A | 4/2019 |
| JP | 2020-143977 | A | 9/2020 |

OTHER PUBLICATIONS

Akiyama et al., "Development of excitation test method for non-synchronous vibration of rotating turbine blade (Measurement of damping of non-synchronous vibration mode)", Transactions of the JSME, vol. 82, No. 838, 2016, 13 pages (with English Abstract).

Japanese Decision to Grant issued Aug. 19, 2025, in Japanese Patent Application 2024-511209, 1 page.

* cited by examiner

FIG. 8

| | Nd | | | | | | | | | | | |
|---|---|---|---|---|---|---|---|---|---|---|---|---|
| J0 | 1 | 2 | 3 | 4 | 5 | 6 | 7 | 8 | 9 | 10 | 11 | 12 |
| 2 | 1.0 | 2.0 | 3.0 | 4.0 | 5.0 | 6.0 | 7.0 | 8.0 | 9.0 | 10.0 | 11.0 | 12.0 |
| 3 | 0.7 | 1.3 | 2.0 | 2.7 | 3.3 | 4.0 | 4.7 | 5.3 | 6.0 | 6.7 | 7.3 | 8.0 |
| 4 | 0.5 | 1.0 | 1.5 | 2.0 | 2.5 | 3.0 | 3.5 | 4.0 | 4.5 | 5.0 | 5.5 | 6.0 |
| 5 | 0.4 | 0.8 | 1.2 | 1.6 | 2.0 | 2.4 | 2.8 | 3.2 | 3.6 | 4.0 | 4.4 | 4.8 |
| 6 | 0.3 | 0.7 | 1.0 | 1.3 | 1.7 | 2.0 | 2.3 | 2.7 | 3.0 | 3.3 | 3.7 | 4.0 |
| 7 | 0.3 | 0.6 | 0.9 | 1.1 | 1.4 | 1.7 | 2.0 | 2.3 | 2.6 | 2.9 | 3.1 | 3.4 |
| 8 | 0.3 | 0.5 | 0.8 | 1.0 | 1.3 | 1.5 | 1.8 | 2.0 | 2.3 | 2.5 | 2.8 | 3.0 |
| 9 | 0.2 | 0.4 | 0.7 | 0.9 | 1.1 | 1.3 | 1.6 | 1.8 | 2.0 | 2.2 | 2.4 | 2.7 |
| 10 | 0.2 | 0.4 | 0.6 | 0.8 | 1.0 | 1.2 | 1.4 | 1.6 | 1.8 | 2.0 | 2.2 | 2.4 |
| 11 | 0.2 | 0.4 | 0.5 | 0.7 | 0.9 | 1.1 | 1.3 | 1.5 | 1.6 | 1.8 | 2.0 | 2.2 |
| 12 | 0.2 | 0.3 | 0.5 | 0.7 | 0.8 | 1.0 | 1.2 | 1.3 | 1.5 | 1.7 | 1.8 | 2.0 |

TRAVELING-WAVE EXCITATION DEVICE AND TRAVELING-WAVE EXCITATION METHOD

CROSS-REFERENCE TO RELATED APPLICATIONS

The present application is a continuation of International Application No. PCT/JP2022/045066, filed on Dec. 7, 2022, and based upon and claims the benefit of priority from Japanese Patent Application No. 2022-058812, filed on Mar. 31, 2022), the entire contents of which are incorporated herein by reference.

TECHNICAL FIELD

The disclosure relates to a traveling-wave excitation device and a traveling-wave excitation method.

BACKGROUND

Rotor blades provided in jet engines and the like include a disk and a plurality of blades attached to an outer periphery of the disk. If there is a variation in natural vibration frequency among blades of a rotor blade due to influences such as the mass of each blade, the rigidity thereof, and the like, a resonant response of the rotor blade during rotation sometimes increases unexpectedly, shortening the service life of the rotor blade.

Japanese Patent Application Publication No. 2002-98584 discloses a method for measuring vibrations of blades during rotation of a rotor blade. Vibrations of the blades thus measured can be utilized to obtain the amplitudes, phases, and frequencies of blade vibrations, which are necessary for monitoring blade vibrations during rotation of the rotor blade.

SUMMARY

A blade vibration of a rotor blade during rotation is a vibration response of the rotor blade to a periodic excitation force generated in each blade of the rotor blade by the rotation. When each blade of a rotor blade is excited by a vibration simulating a periodic excitation force during rotation, a vibration response of the rotor blade to a periodic excitation force on each blade can be reproduced.

A vibration response of a rotor blade during rotation is a traveling wave. In the case of conducting a vibration response test simulating a periodic excitation force during rotation on a rotor blade in a stationary state, each blade of the rotor blade is excited by using a signal of a phase-controlled traveling wave, a vibration of each excited blade is measured, and a vibration response of the rotor blade in a mode which is a measurement target is specified from the measured vibrations. To excite blades of a rotor blade, it is necessary to input phase-controlled signals from each channel of a signal source to a plurality of excitation sources corresponding to the respective blades.

The disclosure is directed to a traveling-wave excitation device and a traveling-wave excitation method that are capable of exciting all blades of a rotor blade in which the number of the blades is more than the number of channels by using excitation signals of traveling waves outputted by a signal source from each channel.

A traveling-wave excitation device in accordance with the disclosure includes: a plurality of excitation sources having a one-to-one correspondence with a plurality of blades of a rotor blade and configured to excite the plurality of blades with phases corresponding to excitation signals inputted respectively to the plurality of excitation sources; a signal source configured to output, respectively from a plurality of channels, the excitation signals of traveling waves with phases different for the respective channels, and a connector configured to connect a pair of excitation sources of the plurality of excitation sources to a same one of the channels of the signal source, the pair of excitation sources corresponding to a pair of blades of the plurality of blades located at positions different from each other by 180° in a rotation direction of the rotor blade. The connector is configured to: upon a number of nodal diameters of a vibration to be generated in the rotor blade by excitation of the plurality of blades being an even number, cause the excitation signals outputted from one channel of the plurality of channels to be inputted respectively to the pair of excitation sources connected to the one channel with a same phase; and upon the number of the nodal diameters being an odd number, cause the excitation signals outputted from the one channel to be inputted respectively to the pair of excitation sources connected to the one channel with opposite phases.

The connector may be configured to: connect multiple excitation sources of the plurality of excitation sources to each of the channels of the signal source; and in a case where relations of the number of nodal diameters Nd, a number of the blades N0 of the rotor blade, a number of the multiple excitation sources J0 connected to each of the channels of the signal source satisfy N0=n×J0 wherein a coefficient n is a natural number, and 2Nd=m×J0 wherein a coefficient m is an integer, upon the coefficient m being an even number, cause the excitation signals outputted from the one channel to be inputted respectively to the multiple excitation sources connected to the one channel with a same phase as a phase at a time of output from the one channel, and upon the coefficient m being an odd number, cause the excitation signals outputted from the one channel to be inputted respectively to the multiple excitation sources connected to the one channel with a phase alternately reversed between the same phase as the phase at the time of output from the one channel and a phase opposite thereto, in an order of arrangement of multiple blades of the plurality of blades corresponding to the multiple excitation sources in the rotation direction.

The rotor blade may be a blisk in which the plurality of blades are formed integrally with a disk.

A traveling-wave excitation method in accordance with the disclosure includes, when exciting a plurality of blades of a rotor blade by using a plurality of excitation sources which have a one-to-one correspondence with the plurality of blades with phases corresponding to excitation signals inputted respectively to the plurality of excitation sources, upon a number of nodal diameters of a vibration to be generated in the rotor blade by excitation of the plurality of blades being an even number, causing a same excitation signal to be inputted respectively to a pair of excitation sources of the plurality of excitation sources with a same phase, the pair of excitation sources corresponding to a pair of blades of the plurality of blades located at positions different from each other by 180° in a rotation direction of the rotor blade, and upon the number of the nodal diameters being an odd number, causing the same excitation signal to be inputted respectively to the pair of excitation sources with opposite phases.

The disclosure makes it possible to excite all blades of a rotor blade in which the number of the blades is more than the number of channels by using excitation signals of traveling waves outputted by a signal source from each channel.

BRIEF DESCRIPTION OF DRAWINGS

FIG. 8 is a diagram showing relations of phases of excitation signals to be outputted to each corresponding pair of excitation sources by a switch part of the switcher of FIG. 2 with a phase at the time of output from each channel.

DETAILED DESCRIPTION

Figure 1:
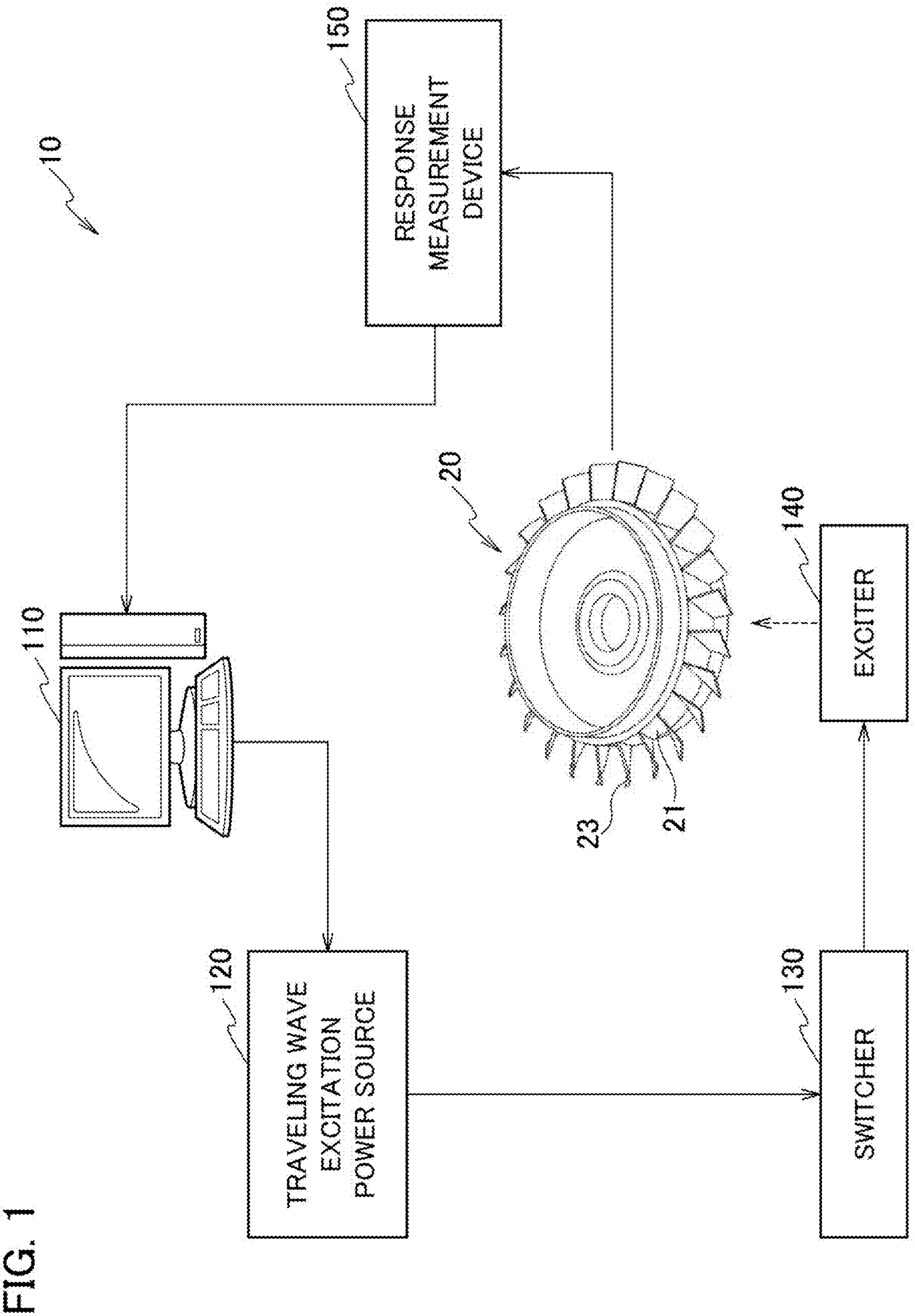
FIG. 1 is a diagram showing a vibration response testing device according to one embodiment.

Hereinafter, several illustrative embodiments will be described with reference to the drawings. FIG. 1 is a diagram showing a vibration response testing device 10 for a blisk 20 according to one embodiment.

The vibration response testing device 10 of the embodiment shown in FIG. 1 is a device for conducting a vibration response test on a blisk 20 as a rotor blade. The vibration response testing device 10 is capable of conducting a traveling-wave excitation method according to the disclosure and configuring a traveling-wave excitation device according to the disclosure.

The blisk 20 shown in FIG. 1 is obtained by integrally forming a plurality of blades 23 on an outer periphery of a disk 21. The blisk 20 shown in FIG. 1 is only one simplified for description. The number of the blades 23 formed on the disk 21 is not limited to the number shown in FIG. 1. The vibration response testing device 10 can also be used in a vibration response test for a rotor blade (not shown) formed by fitting dovetails of blades into an outer periphery of a disk.

The vibration response testing device 10 of the present embodiment includes a control computer 110, a traveling-wave excitation power source 120 as a signal source, a switcher 130 as a connector, an exciter 140, and a response measuring device 150.

The exciter 140 includes a plurality of excitation sources. The excitation sources can be configured by using, for example, a shaker, a speaker, an oscillator, or the like. The plurality of excitation sources have a one-to-one correspondence with the plurality of blades 23 of the blisk 20.

To each excitation source of the exciter 140, an excitation signal by a phase-controlled traveling wave with the same frequency and amplitude is inputted. Each excitation source is driven by the inputted excitation signal.

The traveling wave mentioned here means a traveling wave in a broad sense. The traveling wave in a broad sense includes a forward wave in a narrow sense, of which the phase travels in a positive direction (+x direction) with the elapse of time, and a backward wave of which the phase travels in a negative direction (−x direction) with the elapse of time. The traveling wave mentioned in the following description means the traveling wave in a broad sense.

Each excitation source of the exciter 140 driven by the excitation signal generates a vibration in accordance with a waveform of the excitation signal. The corresponding blades 23 of the blisk 20 which face the respective excitation sources are excited by the vibrations generated by the respective excitation source.

As the respective blades 23 of FIG. 1 are excited by the corresponding excitation sources, vibrations simulating periodic excitation forces during rotation are generated in the respective blades 23 of the blisk 20. The response measuring device 150 measures a vibration in each blade 23. The response measuring device 150 measures a vibration of each blade 23 in a contactless manner, for example, in accordance with a conventionally known method that includes receiving a reflected wave of an electromagnetic wave for distance measurement delivered to a blade surface.

Figure 2:
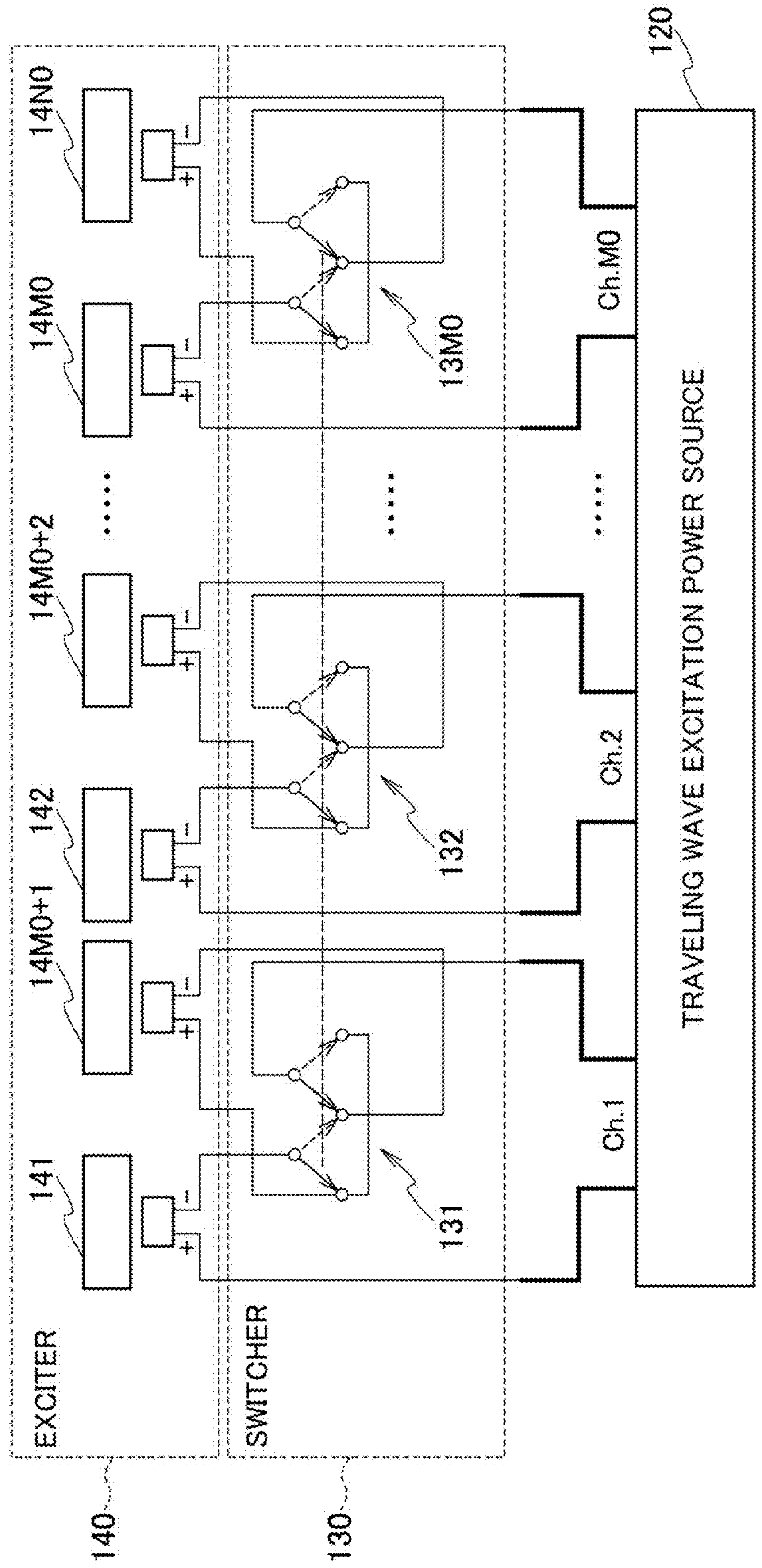
FIG. 2 is a diagram showing an example of a circuit configuration of main parts of a switcher of the vibration response testing device of FIG. 1.

The switcher 130 connects each excitation source of the exciter 140 to one of a plurality of channels of the traveling-wave excitation power source 120. The channels of the traveling-wave excitation power source 120 respectively output excitation signals of traveling waves having phases different among the channels. The traveling-wave excitation power source 120 of the present embodiment includes 1 to M0, M0 channels Ch.1 to Ch.M0 as shown in FIG. 2. In the present embodiment, the number of the channels M0 of the traveling-wave excitation power source 120 is half (M0=N0/2) of the number of the blades N0 of the blisk 20 of FIG. 1.

If the excitation sources of the exciter 140 were connected one by one to the respective channels Ch.1 to Ch.M0 of the traveling-wave excitation power source 120 of FIG. 2, the excitation sources corresponding to half (M0=N0/2) of the blades 23 of the blisk 20 could not be connected to the traveling-wave excitation power source 120. The excitation sources that cannot be connected to the traveling-wave excitation power source 120 cannot be driven by the excitation signals from the traveling-wave excitation power source 120 to excite the corresponding blades 23 with phases corresponding to the excitation signals.

In a general vibration response test for rotor blades, when some blades of a rotor blade are excited by an excitation signal of a traveling wave, a standing wave is generated during vibration of the excited blades, so that the blades are excited in a plurality of modes including not only a mode which is the measurement target but also a mode which is not the measurement target. If the vibrations of the measured blades contain a vibration of a mode which is not the measurement target, it becomes difficult to specify a vibration response of the rotor blade in the mode which is the measurement target from a result of measurement of the vibrations of the blades, so that the reliability of the result of the test for the vibration response of the rotor blade in the mode which is the measurement target decreases. In a vibration response test of a rotor blade, it is important to excite all the blades of the rotor blade with excitation signals of traveling waves and focus excitation of the blades in a mode which is the measurement target.

In the vibration response testing device 10 of the present embodiment, the switcher 130 connects each one of sets each composed of a pair of two excitation sources of the exciters 140 to one of the channels Ch.1 to Ch.M0 of the traveling-wave excitation power source 120. Two excitation sources of each set connected to the same channel Ch.1 to Ch.M0 are a pair of excitation sources corresponding to a pair of blades located at positions different from each other by 180° in a rotation direction of the blisk 20.

Figure 3:
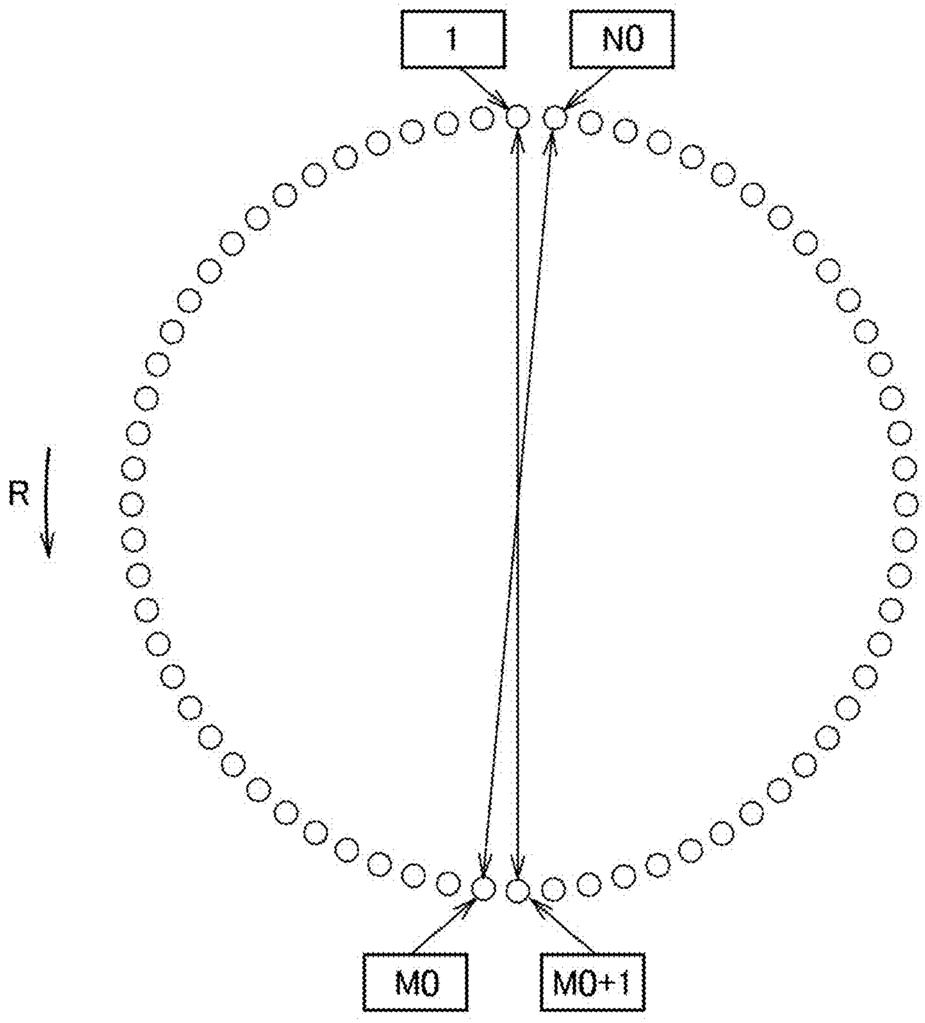
FIG. 3 is a diagram schematically showing arrangement of each blade which a blisk of FIG. 1 has.

It is often the case that the number of the blades N0 of the blisk 20 is an even number in order to take a balance during rotation. As shown in FIG. 3, in the blisk 20, there are pairs of blades located at positions different from each other by 180° in the rotation direction R of the blisk 20. Blade numbers 1 and M0+1, and blade numbers M0 and N0 shown in FIG. 3 correspond to a pair of blades 23 located at positions different from each other by 180° in the rotation direction R of the blisk 20 of FIG. 1.

Figure 4A:
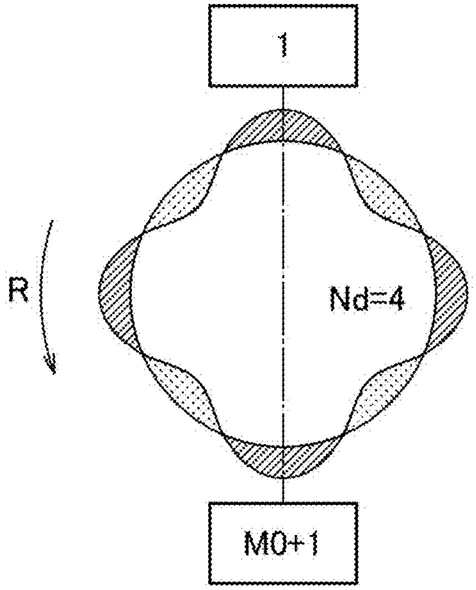
FIG. 4A is a diagram showing a relation of phases of vibrations which are generated respectively in a pair of blades located at positions different from each other by 180° in a rotation direction of the blisk in the case where the number of nodal diameters of a vibration to be generated in the blisk of FIG. 1 is four.
Figure 4B:
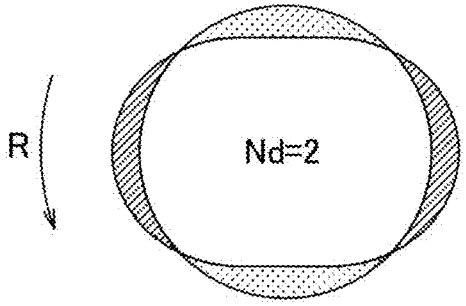
FIG. 4B is a diagram showing a relation of phases of vibrations which are generated respectively in a pair of blades located at positions different from each other by 180° in the rotation direction of the blisk in the case where the number of nodal diameters of a vibration to be generated in the blisk of FIG. 1 is two.
Figure 4C:
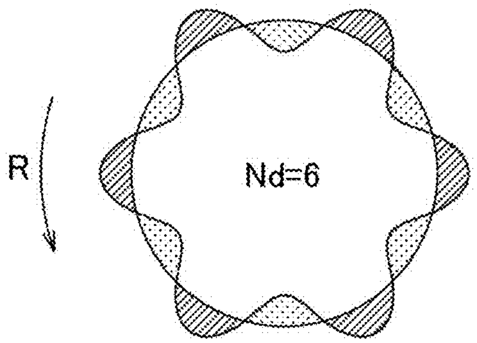
FIG. 4C is a diagram showing a relation of phases of vibrations which are generated respectively in a pair of blades located at positions different from each other by 180° in the rotation direction of the blisk in the case where the number of nodal diameters of a vibration to be generated in the blisk of FIG. 1 is six.

In the case of generating a vibration response of which the number of nodal diameters Nd=4 in the blisk 20, excitation forces caused by excitation signals with the same amplitude and the same phase are applied respectively to a pair of blades 23 located at positions different from each other by 180° in the rotation direction R of the blisk 20 as shown in FIG. 4A. In the case of generating a vibration response of which the number of nodal diameters Nd=2, 6 in the blisk 20 as well, excitation forces caused by excitation signals with the same amplitude and the same phase are applied respectively to a pair of blades 23 located at positions different from each other by 180° in the rotation direction R of the blisk 20 as shown in FIG. 4B and FIG. 4C.

Figure 5:
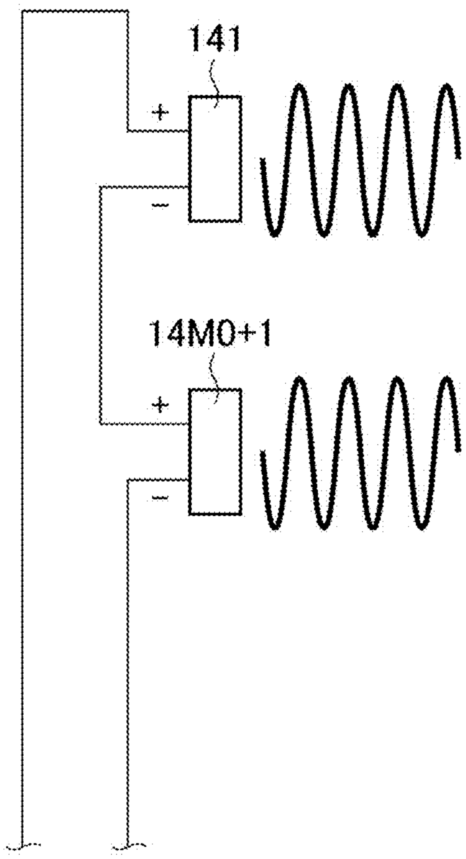
FIG. 5 is a diagram schematically showing excitation signals with the same phase to be inputted respectively to a pair of excitation sources corresponding to a pair of blades located at positions different from each other by 180° of the blisk in the case where the number of nodal diameters of a vibration response to be generated in the blisk of FIG. 1 is an even number.

It can be understood that in order to generate a vibration response of which the number of nodal diameters Nd is an even number in the blisk 20 by excitation simulating a periodic excitation force during rotation, a pair of excitation sources corresponding to a pair of blades 23 located at positions different from each other by 180° of the blisk 20 only have to be driven with excitation signals with the same amplitude and the same phase. FIG. 5 schematically shows excitation signals with the same phase which are inputted respectively to a pair of excitation sources 141, 14M0+1 corresponding to a pair of blades 23 located at positions different from each other by 180° of the blisk 20 in the case where the number of nodal diameters Nd of a vibration response to be generated in the blisk 20 is an even number.

Figure 6A:
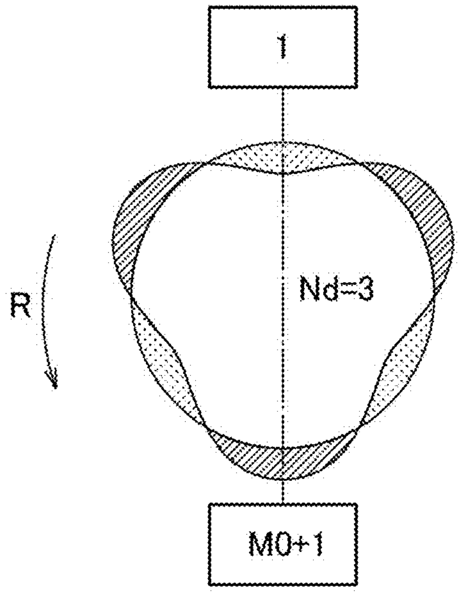
FIG. 6A is a diagram showing a relation of phases of vibrations which are generated respectively in a pair of blades located at positions different from each other by 180° in the rotation direction of the blisk in the case where the number of nodal diameters of a vibration to be generated in the blisk of FIG. 1 is three.
Figure 6B:
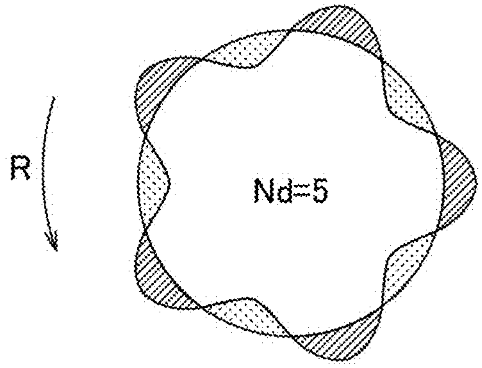
FIG. 6B is a diagram showing a relation of phases of vibrations which are generated respectively in a pair of blades located at positions different from each other by 180° in the rotation direction of the blisk in the case where the number of nodal diameters of a vibration to be generated in the blisk of FIG. 1 is five.
Figure 6C:
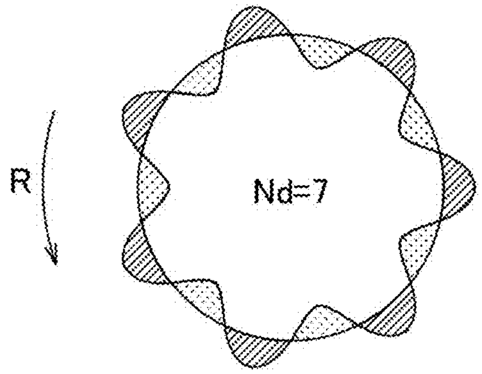
FIG. 6C is a diagram showing a relation of phases of vibrations which are generated respectively in a pair of blades located at positions different from each other by 180° in the rotation direction of the blisk in the case where the number of nodal diameters of a vibration to be generated in the blisk of FIG. 1 is seven.

In the case of generating a vibration response of which the number of nodal diameters Nd=3 in the blisk 20, excitation forces caused by excitation signals with the same amplitude and the opposite phases are applied respectively to a pair of blades 23 located at positions different from each other by 180° in the rotation direction R of the blisk 20 as shown in FIG. 6A. In the case of generating a vibration response of which the number of nodal diameters Nd=5, 7 in the blisk 20 as well, excitation forces caused by excitation signals with the same amplitude and the opposite phases are applied respectively to a pair of blades 23 located at positions different from each other by 180° in the rotation direction R of the blisk 20 as shown in FIG. 6B and FIG. 6C.

Figure 7:
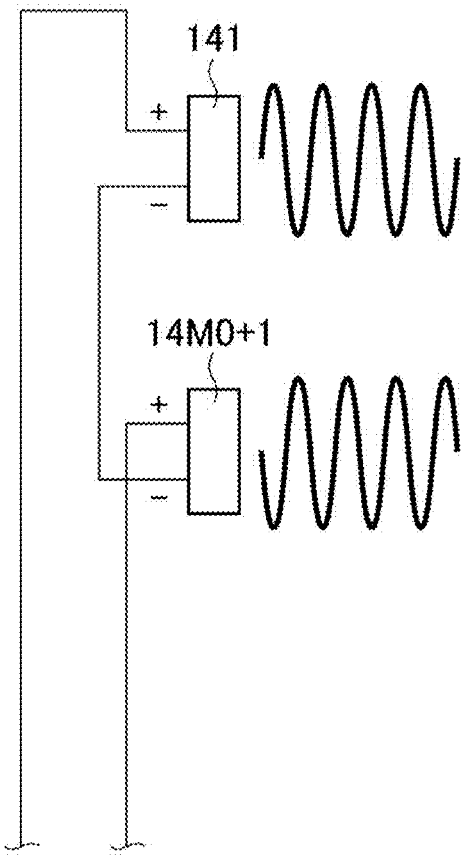
FIG. 7 is a diagram schematically showing excitation signals with opposite phases which are inputted respectively to a pair of excitation sources corresponding to a pair of blades located at positions different from each other by 180° of the blisk in the case where the number of nodal diameters of a vibration to be generated in the blisk of FIG. 1 is an odd number.

It can be understood that in order to generate a vibration response of which the number of nodal diameters Nd is an odd number in the blisk 20 by excitation simulating a periodic excitation force during rotation, a pair of excitation sources corresponding to a pair of blades 23 located at positions different from each other by 180° of the blisk 20 only have to be driven with excitation signals with the same amplitude and the opposite phases. FIG. 7 schematically shows excitation signals with the opposite phases which are inputted respectively to a pair of excitation sources 141, 14M0+1 corresponding to a pair of blades 23 located at positions different from each other by 180° of the blisk 20 in the case where the number of nodal diameters Nd of a vibration response to be generated in the blisk 20 is an odd number.

The switcher 130 of FIG. 1 can connect a plurality of excitation sources corresponding to a plurality of blades 23 of the blisk 20 to one of the channels of the traveling-wave excitation power source 120. In the example shown in FIG. 2, the switcher 130 connects a pair of excitation sources corresponding to a pair of blades 23 located at positions different from each other by 180° of the blisk 20 to one channel Ch.1 to Ch.M0 of the traveling-wave excitation power source 120.

To the channel Ch.1 of the traveling-wave excitation power source 120, a set of a pair of excitation sources 141, 14M0+1 corresponding to a pair of blades 23 located at positions different from each other by 180° of the blisk 20 are connected by the switcher 130. To the channel Ch.2, a set of a pair of excitation sources 142, 14M0+2 corresponding to a pair of blades 23 located at positions different from each other by 180° of the blisk 20 are connected by the switcher 130. The set of the pair of blades 23 corresponding to the set of excitation sources 142, 14M0+2 are arranged next to the set of the pair of blades 23 corresponding to the set of excitation sources 141, 14M0+1 in the rotation direction R of the blisk 20.

To each channel following the channel Ch.2, a pair of excitation sources of a corresponding set following the excitation sources 142, 14M0+2 are connected by the switcher 130 in the order of arrangement of the corresponding sets of the pairs of blades 23 in the rotation direction R of the blisk 20. To the channel Ch.M0 of the traveling-wave excitation power source 120, a set of excitation sources 14M0, 14N0 corresponding to a pair of blades 23 arranged at the last positions in the order of arrangement in the rotation direction R of the blisk 20 are connected by the switcher 130.

The traveling-wave excitation power source 120 can change the frequency of an excitation signal to be outputted from each channel Ch.1 to Ch.M0 and a difference in phase among the channels Ch.1 to Ch.M0 in accordance with the number of nodal diameters Nd of a vibration to be generated in the blisk 20 by exciting each blade 23.

To a pair of excitation sources of each set, phase-controlled excitation signals with the same amplitude are inputted from the channel Ch.1 to Ch.M0 of the traveling-wave excitation power source 120 to be connected by the switcher 130. The switcher 130 includes switch parts 131 to 13M0. Each switch part 131 to 13M0 can switch the phases of excitation signals to be inputted to a pair of excitation sources of each corresponding set between the same phase and the opposite phases.

Each switch part 131 to 13M0 can input excitation signals outputted from each channel Ch.1 to Ch.M0 to a pair of excitation sources of the corresponding set while switching the phases of the excitation signals between the same phase as that at the time of output from each channel Ch.1 to Ch.M0 and a phase opposite thereto. Relations of phases of excitation signals to be inputted by each switch part 131 to 13M0 to a pair of excitation sources of a corresponding set with a phase at the time of output from each channel Ch.1 to Ch.M0 can be defined as in a table shown in FIG. 8.

In the table of FIG. 8, a row (horizontal) indicates the number of nodal diameters Nd of a vibration to be generated in the blisk 20, and a column (vertical) indicates the number of excitation sources J0 connected to one channel Ch.1 to Ch.M0. The number of excitation sources J0 corresponds to the number of excitation sources connected to each channel of the signal source.

The phases of excitation signals to be inputted by each switch part 131 to 13M0 to a pair of excitation sources of a corresponding set are either the same phase or the opposite phases. A relative difference in phase between excitation signals from each channel Ch.1 to Ch.M0, which are outputted by each switch part 131 to 13M0 to a corresponding pair of excitation sources, needs to be a multiple of 180°.

A relative difference in phase between excitation signals to be inputted respectively to a pair of excitation sources can be expressed by $2\times180°\times Nd/J0$. If the number of nodal diameters Nd and the number of excitation sources J0 satisfy $2\times Nd/J0=m$ (provided that the coefficient m is an integer), excitation signals with the same phase or the opposite phases can be inputted to a pair of excitation sources of a corresponding set by the switching of each switch part 131 to 13M0. A numerical value in a frame of an intersection of each row and each column in the table of FIG. 8 is a value of $2\times Nd/J0$ mentioned above.

In the present embodiment, since sets of pairs of excitation sources are connected one by one to one channel Ch.1 to Ch.M0 of the traveling-wave excitation power source 120, the number of excitation sources J0 is two. In the case where the number of excitation sources J0 connected to one channel Ch.1 to Ch.M0 is two, the value of $2\times Nd/J0$ mentioned above becomes an integer (1.0 to 12.0) for all the numbers of nodal diameters Nd (Nd=1 to 12) shown in FIG. 8. Since the value of $2\times Nd/J0$ becomes an integer, the above-described condition that the coefficient m is an integer is satisfied.

In the case where the number of nodal diameters Nd is an odd number, the coefficient m becomes an odd number, and a relative difference in phase between excitation signals to be inputted respectively to a pair of excitation sources becomes an odd multiple of 180°. In the case where the coefficient m is an odd number, the switcher 130 switches each switch part 131 to 13M0 such that excitation signals are outputted with phases opposite to phases at the time of output from each channel Ch.1 to Ch.M0.

In the case where the number of nodal diameters Nd is an even number, the coefficient m becomes an even number, and a relative difference in phase between excitation signals to be inputted respectively to a pair of excitation sources becomes an even multiple of 180°. In the case where the coefficient m is an even number, the switcher 130 switches each switch part 131 to 13M0 such that the excitation signals are outputted with the same phases as phases at the time of output from each channel Ch.1 to Ch.M0.

In the case where the number of nodal diameters Nd is an even number, the switcher 130 switches each switch part 131 to 13M0 such that excitation signals are inputted respectively to a pair of excitation sources of a corresponding set with the same phase. In the case where the number of nodal diameters Nd is an odd number, the switcher 130 switches each switch part 131 to 13M0 such that excitation signals are inputted respectively to a pair of excitation sources of a corresponding set with the opposite phases.

Whether the number of nodal diameters Nd is an even number or an odd number may be set in the switcher 130 by the user who conducts the test through the user's operation, or may be set in the switcher 130 by means of a signal from the control computer 110, for example. The switcher 130 switches each switch part 131 to 13M0 depending on whether the set number of nodal diameters Nd is an even number or an odd number to switch excitation signals to be inputted respectively to a pair of excitation sources of a corresponding set between the same phase and the opposite phases.

In the vibration response testing device 10 of the present embodiment, excitation signals to be inputted respectively to a pair of excitation sources connected to each channel Ch.1 to Ch.M0 of the traveling-wave excitation power source 120 can be switched between the same phase and the opposite phases by the switcher 130. In the vibration response testing device 10, all the blades 23 of the blisk 20 the number of blades of which is larger than the number of the channels Ch.1 to Ch.M0 can be excited by the excitation sources with excitation signals outputted by the traveling-wave excitation power source 120 from the channels Ch.1 to Ch.M0.

Since the number of channels necessary in the traveling-wave excitation power source 120 can be made smaller than the number of blades of the blisk 20 to be tested, it is possible to suppress electric power consumed by the traveling-wave excitation power source 120 to input excitation signals to all the excitation sources corresponding to all the blades 23. Suppression of electric power consumed by the traveling-wave excitation power source 120 can lead to protection of resources used for power generation and reduction in emission of greenhouse gases, thus contributing to an achievement of Sustainable Development Goals (SDGs).

In the above-described embodiment, the case where the number of blades is an even number and a pair of excitation sources are connected to one channel Ch.1 to Ch.M0 of the traveling-wave excitation power source 120 has been described. As described below, the number of excitation sources to be connected to one channel Ch.1 to Ch.M0 may be set to an even number or odd number of three or more as long as conditions are satisfied. In addition, the number of blades is not limited to an even number and may be set to an odd number as long as conditions are satisfied.

In the case where relations of the number of nodal diameters Nd, the number of the blades N0 of the blisk 20, and the number of excitation sources J0 connected to each channel Ch.1 to Ch.M0 of the traveling-wave excitation power source 120 satisfy conditions of N0=n×J0 (provided that the coefficient n is a natural number) and 2Nd=m×J0 (provided that the coefficient m is an integer), three or more excitation sources can be connected to each channel Ch.1 to Ch.M0. These conditions are satisfied in the cases of combinations of the number of nodal diameters Nd and the number of excitation sources J0 connected which are indicated by being surrounded by thick frames in FIG. 8.

For example, in the case where the number of nodal diameters Nd to be generated in the blisk 20 is Nd=4, four or eight excitation sources can be connected to one channel Ch.1 to Ch.M0 by four or eight switch parts 131 to 13M0 of the switcher 130. In the case where the number of nodal diameters Nd=4, the phases of vibration responses in a pair of blades 23 located at positions different from each other by 180° of the blisk 20 coincide at positions at every 45° in the rotation direction R of the blisk 20 as shown in FIG. 4A.

At positions of 0° and 90° in the rotation direction R of the blisk 20, the phases of vibration responses in a pair of blades 23 located at positions different from each other by 180° of the blisk 20 coincide. At positions of 45° and of 135° in the rotation direction R of the blisk 20, the phases of vibration responses in a pair of blades 23 located at positions different from each other by 180° of the blisk 20 coincide.

In the case of connecting four excitation sources corresponding to four blades 23 at every 90° of the blisk 20 to one channel Ch.1 to Ch.M0, the coefficient m becomes an even number (2.0) as shown in FIG. 8. The switcher 130 switches four switch parts 131 to 13M0 such that excitation signals with the same phase are inputted to respective excitation sources corresponding to respective blades 23 located at positions different from each other by 90°.

In the case of connecting eight excitation sources corresponding to eight blades 23 at every 45° of the blisk 20 to one channel Ch.1 to Ch.M0, the coefficient m becomes an odd number (1.0) as shown in FIG. 8. The switcher 130 alternately inputs excitation signals with the same phase and excitation signals with the opposite phases to respective excitation sources corresponding to respective blades 23 located at positions different from each other by 45° in the order of arrangement of the blades 23 corresponding to the excitation sources in the rotation direction R.

In the order of arrangement in the rotation direction R of the blisk 20, to a pair of excitation sources corresponding to the blades 23 at positions of 0° and 180°, excitation signals with the same phase are inputted. To a pair of excitation sources corresponding to the blades 23 at positions of 45° and 225°, excitation signals with the opposite phases are inputted. To a pair of excitation sources corresponding to the blades 23 at positions of 90° and 270°, excitation signals with the same phase are inputted. To a pair of excitation sources corresponding to the blades 23 at positions of 135° and 315°, excitation signals with the opposite phases are inputted.

The switcher 130 switches four switch parts 131 to 13M0 in accordance with excitation signals to be inputted to corresponding excitation sources to alternately reverse the phases between the excitation signals with the same phase and the excitation signals with the opposite phases.

In the case where the number of nodal diameters Nd is a number other than four as well, for example, in the case where the number of nodal diameters Nd=7, seven excitation sources can be connected to one channel of the traveling-wave excitation power source 120 by seven switch parts 131 to 13M0. In this case, as shown in FIG. 6C, phases of vibration responses in a plurality of blades 23 of the blisk 20 coincide at positions at every one-seventh of 360° in the rotation direction R of the blisk 20. Hence, the seven excitation sources are arranged for the respective blades 23 located at positions obtained by circumferentially dividing the plurality of blades 23 of the blisk 20 into seven equal parts. In the case of connecting seven excitation sources to one channel Ch.1 to Ch.M0, the coefficient m becomes an even number (2.0) as shown in FIG. 8. The switcher 130 switches seven switch parts 131 to 13M0 such that excitation signals with the same phase are inputted to excitation sources corresponding to the respective blades 23 located at positions different from each other by one-seventh of 360° in the rotation direction R of the blisk 20.

As described above, in the case of connecting multiple excitation sources to one channel Ch.1 to Ch.M0, the multiple excitation sources are arranged for blades 23 at positions the number of which is equal to the number of the excitation sources connected to the one channel Ch.1 to Ch.M0 on the periphery of the blade 23. For example, in the case of connecting three excitation sources to one channel Ch.1 to Ch.M0, the excitation sources are arranged in divided three equal parts on the periphery of the blade 23. In the case of connecting four excitation sources to one channel Ch.1 to Ch.M0, the excitation sources are arranged in divided four equal portions on the periphery of the blade 23. In particular, in the case of connecting an even number of excitation sources to one channel Ch.1 to Ch.M0, a plurality of pairs of excitation sources located at positions different from each other by 180° are formed. Then, when the coefficient m is an even number, excitation signals outputted from one channel Ch.1 to Ch.M0 are inputted to multiple excitation sources connected to the one channel Ch.1 to Ch.M0 with the same phase as that at the time of output from the one channel Ch.1 to Ch.M0. On the other hand, when the coefficient m is an odd number, excitation signals outputted from one channel Ch.1 to Ch.M0 are inputted to multiple excitation sources connected to the one channel Ch.1 to Ch.M0 while the phase is alternately reversed between the same phase as that at the time of output from the one channel Ch.1 to Ch.M0 and a phase opposite thereto in the order of arrangement of multiple blades 23 corresponding to multiple excitation sources in the rotation direction.

Even when the number of excitation sources connected to one channel Ch.1 to Ch.M0 is increased, it is possible to excite all the blades 23 of the blisk 20 in which the number of the blades 23 is more than the number of the channels Ch.1 to Ch.M0 with excitation signals outputted from the channel Ch.1 to Ch.M0. By increasing the number of excitation sources to be connected to one channel Ch.1 to Ch.M0, it is possible to further suppress electric power consumed by the traveling-wave excitation power source 120.

The disclosure can be utilized widely in conducting vibration response tests for not only blisks but also rotor blades.

Although several embodiments have been described above, it is possible to modify or change the embodiments based on the above-described disclosure. All the constituent elements of the above-described and all the features described in Claims may be individually selected and combined as long as these do not contradict with each other.

What is claimed is:

1. A traveling-wave excitation device comprising:

a plurality of excitation sources having a one-to-one correspondence with a plurality of blades of a rotor and configured to excite the plurality of blades with phases corresponding to excitation signals inputted respectively to the plurality of excitation sources;

a signal source configured to output, respectively from a plurality of channels, the excitation signals of traveling waves with phases different for the respective channels, and a connector configured to:

connect a pair of excitation sources of the plurality of excitation sources to a same one of the channels of the signal source, the pair of excitation sources corresponding to a pair of blades of the plurality of blades located at positions different from each other by 180° in a rotation direction of the rotor, cause the excitation signals outputted from one channel of the plurality of channels to be inputted respectively to the pair of excitation sources connected to the one channel with a same phase, when a number of nodal diameters of a vibration to be generated in the rotor by excitation of the plurality of blades is an even number, and cause the excitation signals outputted from the one channel to be inputted respectively to the pair of excitation sources connected to the one channel with opposite phases, when the number of the nodal diameters is an odd number.

2. The traveling-wave excitation device according to claim 1, wherein the connector is configured to:

connect multiple excitation sources of the plurality of excitation sources to each of the channels of the signal source; and in a case where relations of the number of nodal diameters Nd, a number of the blades N0 of the rotor, a number of the multiple excitation sources J0 connected to each of the channels of the signal source satisfy $N0 = n \times J0$ wherein a coefficient n is a natural number, and $2Nd = m \times J0$ wherein a coefficient m is an integer, cause the excitation signals outputted from the one channel to be inputted respectively to the multiple excitation sources connected to the one channel with a same phase as a phase at a time of output from the one channel, when the coefficient m is an even number, and cause the excitation signals outputted from the one channel to be inputted respectively to the multiple excitation sources connected to the one channel with a phase alternately reversed between the same phase as the phase at the time of output from the one channel and a phase opposite thereto, in an order of arrangement of multiple blades of the plurality of blades corresponding to the multiple excitation sources in the rotation direction, when the coefficient m is an odd number.

3. The traveling-wave excitation device according to claim 1, wherein the rotor is a blisk in which the plurality of blades are formed integrally with a disk.

4. A traveling-wave excitation method, comprising:

exciting a plurality of blades of a rotor by using a plurality of excitation sources which have a one-to-one correspondence with the plurality of blades with phases corresponding to excitation signals inputted respectively to the plurality of excitation sources;

causing a same excitation signal to be inputted respectively to a pair of excitation sources of the plurality of excitation sources with a same phase, the pair of excitation sources corresponding to a pair of blades of the plurality of blades located at positions different from each other by 180° in a rotation direction of the rotor, when a number of nodal diameters of a vibration to be generated in the rotor by excitation of the plurality of blades is an even number; and causing the same excitation signal to be inputted respectively to the pair of excitation sources with opposite phases, when the number of the nodal diameters is an odd number.

* * * * *